United States Patent Office.

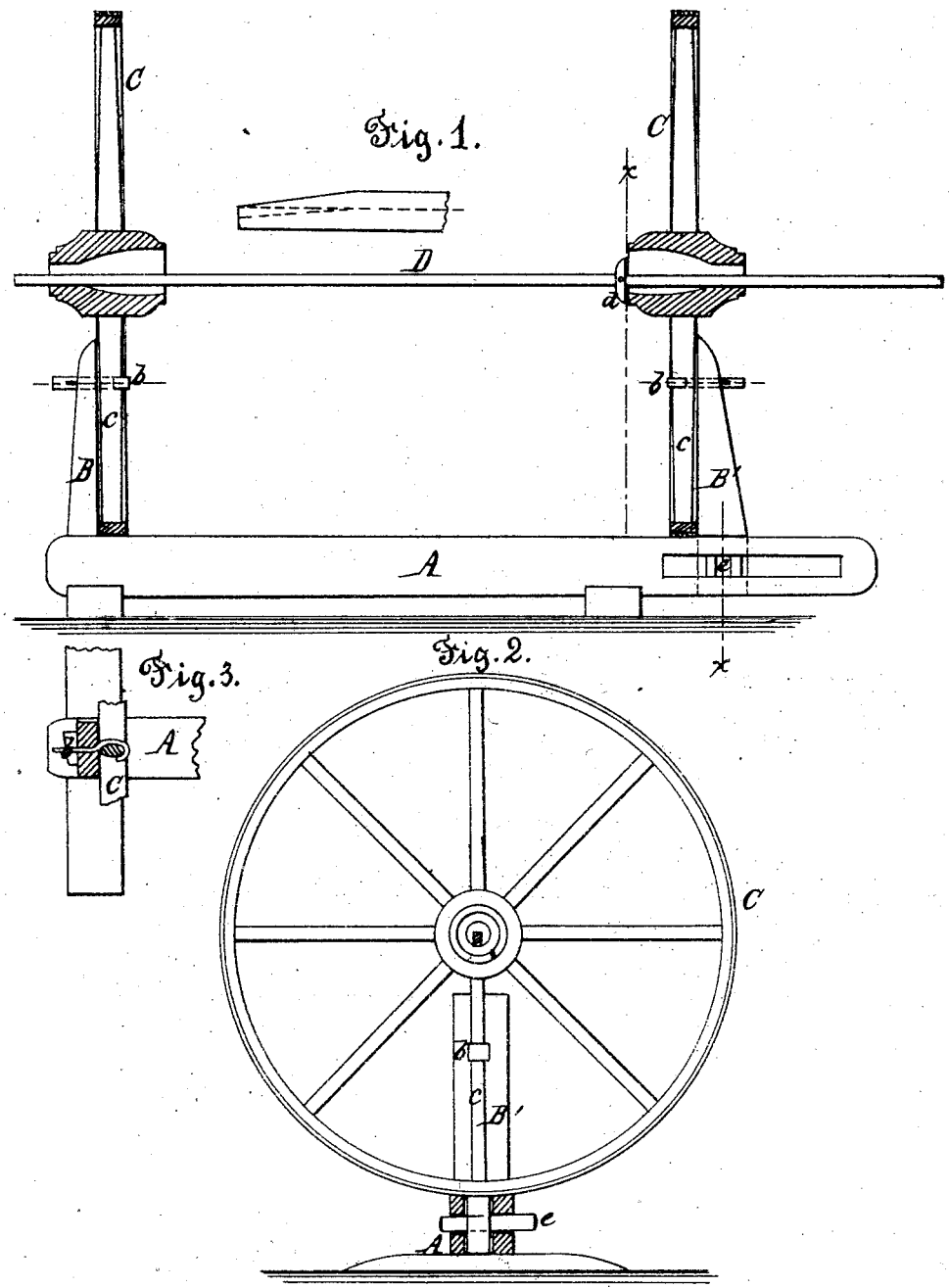

M. S. WILCOX, OF UNION MILLS, INDIANA.

Letters Patent No. 76,126, dated March 31, 1868.

IMPROVED MODE OF SETTING WHEELS ON AXLES.

The Schedule referred to in these Letters Patent and making part of the same.

TO ALL WHOM IT MAY CONCERN:

Be it known that I, M. S. WILCOX, of Union Mills, in the county of La Porte, and State of Indiana, have invented a new and improved Device for Setting Wheels on Axles; and I do hereby declare that the following is a full, clear, and exact description thereof, which will enable others skilled in the art to make and use the same, reference being had to the accompanying drawings, forming part of this specification.

Figure 1 represents a side view of my improved device for setting wheels on an axle, with a pair of wheels in place.

Figure 2 is a cross-section taken in the line $x\ x$, fig. 1.

Similar letters of reference indicate corresponding parts.

This invention relates to a new and useful device for determining the exact length, and also the pitch or set of axles for wagons and other vehicles, in order that the wheels shall run upon a plumb spoke, and shall track alike on all kinds of carriages, without regard to the dish of the wheels.

The difficulty is experienced by all wagon and carriage-makers in adjusting the axle and wheels so that they shall run on a plumb spoke and track alike, both of which objects are accomplished by my improved setting and adjusting-device with great accuracy and dispatch.

This device consists of a bed-piece, A, and two standards, B B, at its opposite ends, one of which standards is movable in a slot, and made fast by a key, $a$, to adjust it to any required width of track. The inner sides of the standards B B' are at right angles to the top of the base or bed-plate A, so that when the wheels C C are fastened to them with hook-clamps $b\ b$ around the lower spokes $c\ c$ in each wheel, that spoke shall stand perpendicular or plumb, whatever may be the dish of the wheel. The wheels are thus set apart at the required width of the track, and the length of the axle from shoulder to shoulder is at once determined by placing one end of a straight-edge and scale, D, against the inner end of the hub of one of the wheels, and moving the gauge-slide $d$ up to the inner end of the other hub, to mark the distance between them. This distance is recorded, and by it the length of the axle between the shoulders is exactly fixed.

Now, in order to determine the set or pitch of the axles of each wheel accurately, and make them accordingly, the straight-edge D is passed through the hubs of the wheels, so that it shall rest upon the lower points of the outer ends of the boxes. The space or distance between the lower sides of the straight-edge and the bottom of the box in the wheel, gives the required set or pitch of the axle, which is ascertained by measuring the distance or width of the spaces at the inner end of the box. This distance gives the required pitch of the box according to the length of the hub, as shown in red, fig. 1. The standard B' is made to slide on the bed A for adjustment, to be secured by a key, $e$, or set-screw. My practice is, first, to place the front pair of wheels on the machine, and take the measures, as above described, and record them; then do the same for the hind wheels, when the axles and wheels may be fitted with absolute certainty of their running on plumb spokes and tracking exactly.

Having thus described my invention, what I claim as new, and desire to secure by Letters Patent, is—

1. The bed-piece A and the standards B B', in combination with the straight-edge and scale D, constructed and operating substantially as and for the purposes described.

2. The clamp-hooks $b\ b$, in combination with the perpendicular standards B B', as and for the purpose set forth.

M. S. WILCOX.

Witnesses:
T. M. LANE,
H. B. TURNER.